United States Patent

Rummel et al.

[15] 3,683,253
[45] Aug. 8, 1972

[54] C.E.M.F. MOTOR SPEED CONTROL SYSTEM

[72] Inventors: Edward W. Rummel, Warrensville Heights, Ohio 44128; Richard H. Funk, Cleveland, Ohio 44111

[73] Assignee: Western Reserve Electronics, Inc., Cleveland, Ohio

[22] Filed: Sept. 16, 1970

[21] Appl. No.: 72,574

[52] U.S. Cl. ................................. 318/331, 318/341
[51] Int. Cl. .............................................. H02p 7/06
[58] Field of Search......318/636, 331, 434, 345, 341, 318/443

[56] References Cited

UNITED STATES PATENTS

| | | | |
|---|---|---|---|
| 3,588,654 | 6/1971 | Balazs | 318/331 |
| 3,436,635 | 4/1969 | James et al. | 318/331 |
| 3,465,227 | 9/1969 | Ivie et al. | 318/434 X |
| 3,488,756 | 1/1970 | Skrivanek, Jr. | 318/331 |

Primary Examiner—J. D. Miller
Assistant Examiner—Robert J. Hickey
Attorney—J. D. Douglass

[57] ABSTRACT

A D.C. motor is connected to a current supply through a switch, the "on" time of which determines the motor speed. Exact speed control is effected by sampling the C.E.M.F. during the "off" time of the power switch, after the inductive jump has decayed, before the motor speed has decayed and before the next power "on" application occurs. The C.E.M.F. is compared with a reference voltage and the motor turned "on" or left "off" depending on whether the C.E.M.F. is higher or lower than the reference voltage. The reference voltage may be manually or automatically adjusted to determine ultimate motor speed.

2 Claims, 2 Drawing Figures

PATENTED AUG 8 1972

3,683,253

INVENTOR.

EDWARD W. RUMMEL
RICHARD H. FUNK

By J. W. Douglas
Their atty

C.E.M.F. MOTOR SPEED CONTROL SYSTEM

This invention relates to motor speed controls operable over wide speed ranges and particularly to a control that will function smoothly and accurately at low speeds. It is particularly useful for controlling the motor speed of direct current motors used in conjunction with motorized film transports to drive the film driving capstan in microfilm viewers such as are used in information retrieval systems.

In such a system it is highly desirable to be able to move a film from a reel through a viewer at a high traverse speed until a point is reached where the required data is located and then to be able to move the film slowly at a point where the desired data is and then very slowly to center the picture on the screen or move slowly from one page to the next.

Heretofore the speed of the capstan was controlled by various mechanisms including clutches, brakes, multiple motors and chains with the undesirable consequences of wear of parts and resultant failure. Where multiple motors were used usually one was required for the film reel and two for the capstan, one for "crawl" and the other for "high" speed.

The present invention enables the film drive capstan to be controlled through a single motor through a wide range of speeds from "crawl" to high traverse.

The eventual control of the motor may be by manual or automatic means, i.e., from demand from another machine.

A desirable way to control the motor speed is by controlling the voltage. The problem, however, is that the speed varies with the load and therefore does not remain constant. A degree of constancy of speed was obtained by a closed loop system in conjunction with a velocity servo, the generator portion for feed back of which adds cost to the system that could be equal to or greater than that of the motor.

In the present invention where the speed is controlled by a voltage, the C.E.M.F. of the motor, which is in direct proportion to the speed of the motor, is used to regulate the speed.

Since the C.E.M.F. is the determinant of speed, in order to find its true value, the IR drop of the motor has to be subtracted from the applied motor voltage. The practicalities of doing the above were hindered because the C.E.M.F. was determined by inserting a fixed external resistance and measuring the IR drop, which was not always of the correct value because the internal resistance of the motor varied. The result was that it was not precise in the velocity servo type precision control at low speeds.

One of the greater problems was realized at very low speeds (crawl), particularly when used with a film viewer because the viewer multiplied the speed deficiencies as much as thirty times in the optical system. At the low end, the terminal voltage becomes so small that the internal frictional resistance causes instantaneous variation in speed known as "cogging," which is simply explained as being that condition where friction overcomes the voltage temporarily and the motor stops and starts depending on the load.

Basically the present invention contemplates the use of a voltage or current power source. Current is preferred with its high impedance because of the changing C.E.M.F. The current is interrupted to the motor and the ratio of the "on" time to the "off" time controls the speed. This type of control works particularly well with printed circuit motors which have low armature inductance as well as the other many desirable attributes. C.E.M.F. is sampled at the motor input terminal after the inductive "kick" ($L = di/dt$) has decayed. The time of the sampling is determined by a control which samples and then holds the information. Thus, the sampling is substantially a true representation of the C.E.M.F. and hence the motor speed at the instant when the power is turned off. The sampling also ceases before the decay of the C.E.M.F.

For a better understanding of the invention reference may be had to the figures of the drawings wherein.

Figure 1:
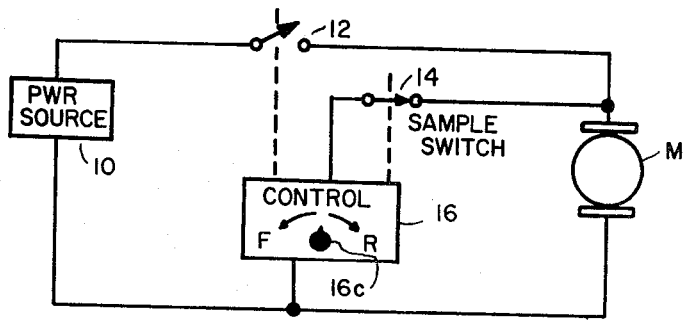
FIG. 1 is a block diagram of the basic circuit.

As shown in FIG. 1, a power source 10 is provided and this is connected to the motor M through a power switch 12. In this instance the power source may be a fixed source of current, this being preferred because it has a high impedance that makes it independent of C.E.M.F. The power switch, which may also include connections to reverse the motor, opens and closes the circuit to the motor. It can be a solid state device with no back leakage. The motor is preferably a servo motor of the type described above, with low inductance in the armature and capable of low speeds such as a type U9M4F made by Photocircuits Corporation. It has multiple commutator bars and thus has a minimum of "lumps" in the C.E.M.F.

A sampling switch 14, which may be a solid state device operating at low millivolts, is connected directly to the motor. The switches 12 and 14 are under control of a control synchronizer 16, as indicated by the dashed lines.

The function of the control synchronizer is to operate the power switch 12, which as stated can be a solid state device, to turn the power to the motor "off" and "on." As stated, the time the power is "on" determines the speed of the motor. In order to maintain the desired speed, as set by the control 16, the C.E.M.F. is sensed. The control synchronizer is arranged to close the sampling switch 14 after the power switch 12 opens and after the inductive jump or kick, due to the opening of the power circuit, has decayed. This gives a true measurement of the C.E.M.F., which is stored and then used to increase or decrease the time the power is on to cause the motor speed to be constant as determined by the manual control 16. In addition, the control synchronizer causes the sampling switch to open before the motor speed dies down.

Figure 2:
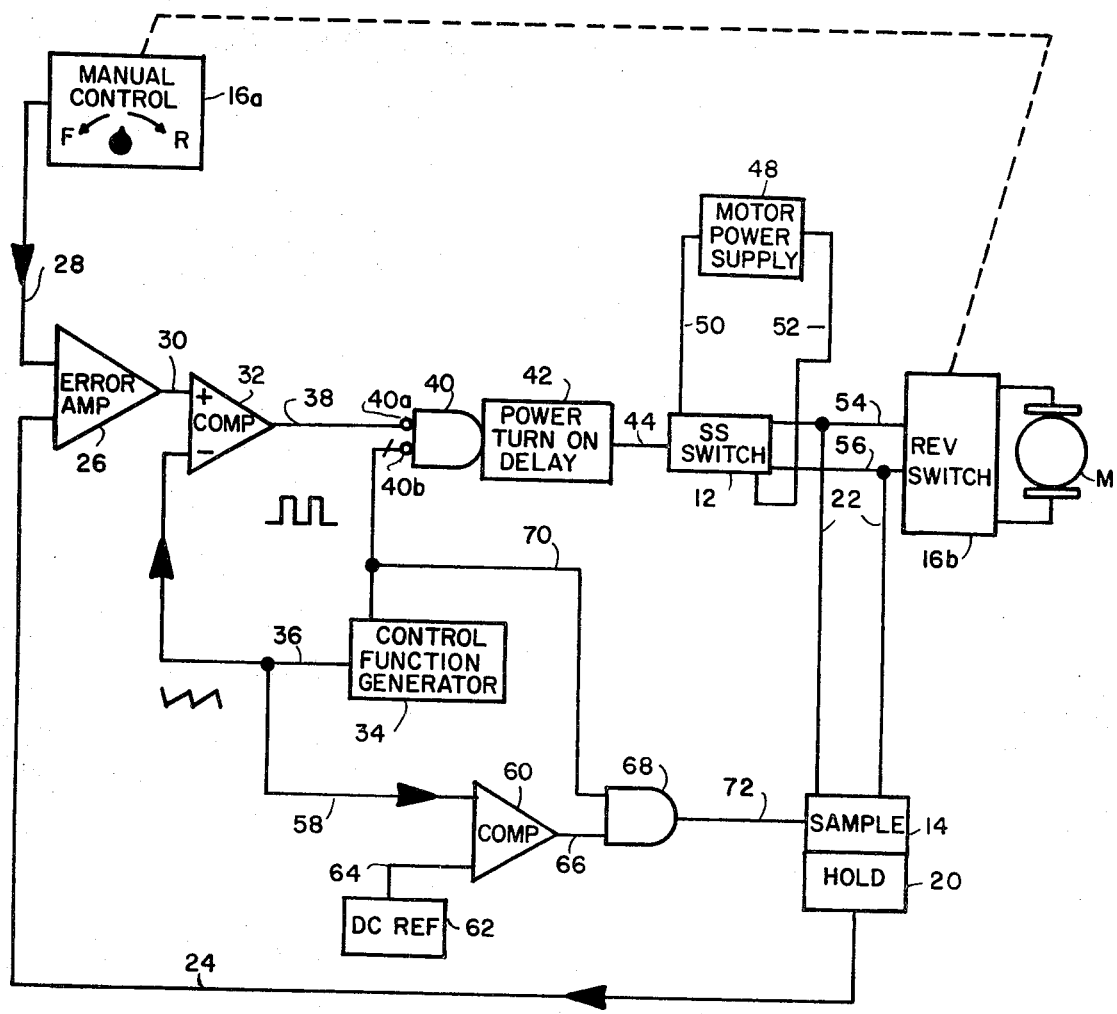
FIG. 2 is a more detailed diagram of a form the invention may take in conjunction with a control circuit.

A more detailed description of one way of controlling the switches is shown by way of example but not necessarily of limitation in FIG. 2.

Assuming that the circuit is "on" and the speed has been set by the control 16a and further assuming that the power switch 12 has just turned "off" and the sampling switch 14 is "on." The C.E.M.F. enters the "-hold" portion 20, which may be and preferably is a capacitor, by lines 22 controlled by the sampling switch 14. From hold 20, the potential of which is determined by the motor speed, the voltage is transferred by line 24 to an error amplifier 26. At the same time a voltage is supplied by the manual control 16a to the error amplifier 26 through the line 28. As indicated by the dashed lines the manual control can be combined with the reversing switch 16b and arranged so that a center position of the control knob 16c is on "off" position and by rotating the knob in one direction from "off" the motor is caused to go forward and in the other direction in reverse, as indicated by F and R. It is pointed out that the voltage in "hold" is to be compared with a manually controlled voltage and, if there is a difference between the two, the time "on" of the main power is increased or decreased to change the motor speed until the voltages are within the desired ratio (1:1 being the objective) and that the error amplifier is desired in order to amplify the difference in these voltages which may be very small and afford a more sensitive and accurate control. Further, assuming that the manual control is set to a fixed negative voltage and that the motor speed is down, the voltage from "hold" is less negative than that from the manual control and there is a negative output. If the motor speed is up, the "hold" voltage becomes more negative and there is a positive output.

The output from the error amplifier is conducted by the line 30 to the comparator circuit 32 and at the same time a signal is fed into this circuit from a control function generator 34 by a line 36.

The control function generator may basically be a multivibrator operating at a predetermined frequency. The frequency should not be too slow or it would lose control or too fast as it will waste power during the switching time. The generator 34 develops a reference sawtooth wave of predetermined amplitude which is applied to the comparator where the error signal is compared with the reference ramp (rising sawtooth). The manual control 16a therefore enables the desired speed to be selected and the signal out of the comparator keeps the speed constant. The manual control sets an upper limit and the signal out of the error amplifier is the difference between the C.E.M.F. and the manual control. If there is negligible difference then the motor is at the right desired speed. The greater the difference the more it is below desired speed. If the signal is high, due to too high speed, the signal into the comparator and the reference signal (sawtooth ramp) will not cause the combination to turn on. Therefore the time the ramp is above the reference signal determines the time the power is turned on.

The signal from comparator 32 is fed by line 38 to the "on" terminal 40a of the "and gate" 40. The control function generator also generates a series of narrow positive substantially rectangular pulses, derived from the decay of the sawtooth wave, which is applied to the off terminal 40b of the "and gate" 40.

Thus it can be seen that if the motor is above speed, there is no signal out of the comparator but that if the motor is below speed there is a signal out and the "and gate" only turns on when the motor is below speed to turn on power and at other times the power is off.

The "and gate" is connected to a "power turn on" delay circuit 42 and thence the signal is through a line 44 to a solid state switch 12 where the power from a motor power supply 48 is fed from the lines 50–52, through the switch and thence by the lines 54–56 to the motor M. The "power on delay" 42 holds off the application of power until the sampling signal is removed.

The sampling switch is turned on by the sawtooth wave and turned off by the pulse. A line 58 connects the generator 34 to a comparator 60 to provide the sawtooth wave to the comparator. A D.C. reference signal is also applied to the comparator from the source 62 via line 64. Thus the comparator can be made to turn on, on that portion of the flyback after the inductive kick has decayed and prior to the start of the sawtooth. By adjusting the D.C. reference the sampler can be turned on at any time on the decay of the sawtooth. The comparator 60 in turn connects by line 66 to the "and gate" 68, the upper terminal of which is connected by a line 70 to the pulse output of the control function generator. The trailing edge turns off the "and gate" before or at the start of the sawtooth ramp. The "and gate" 68 connects by line 72 to sampler switch 14.

As was stated, the specific apparatus of FIG. 2 shows one method of turning "on" the power switch but other methods would be apparent to those versed in the art. Basically FIG. 2 contemplates a fixed frequency with portions of the energizing wave only being used to cause energization. It is contemplated that the results could be obtained by varying the frequency of the energizing wave. In addition, the apparatus shown in FIG. 2 controls the speed by virtue of the fact that the power is turned "off" and "on." For instance, the reversing switch could be solid state devices automatically operated. It will be apparent that the speed could be controlled by applying power in reverse direction, when needed, to cause the motor to slow down. In this instance, the reversing switch could be automatic to automatically provide the reverse power at the time when needed to exercise the desired control.

What is claimed is:

1. An apparatus for controlling the speed of a D.C. motor which includes a source of power for the motor, power switch means between the source of power and the motor to turn the motor on and off, a control means for controlling said power switch means including a C.E.M.F. sensing switch and means connected by the sensing switch to the motor when the power is off to receive the C.E.M.F. of the motor, a source of variable voltage and means for comparing the C.E.M.F. with the variable voltage source to provide a sensed difference voltage and for causing said power switch to close if the C.E.M.F. falls below the value set by the variable voltage source, delay means for the sensing switch to hold the sensing switch open until the decay of the inductive voltage jump due to opening the power switch, generator means for generating an alternating voltage of a predetermined value and the voltage difference between the C.E.M.F. and the variable control voltage is compared in said comparing means with said alternating voltage to cause said power switch to operate, said alternating voltage being of sawtooth waveform and the rising voltage of said sawtooth wave is used to control the turn on of the power switch and said sensed difference voltage is used to control the time the sawtooth turns on the switch and the flyback of said sawtooth waveform is used to control the turn on of the C.E.M.F. sensing switch.

2. An apparatus as described in claim 1, wherein power turn on delay means is connected between the comparing means and the power switch and said means for comparing is an error amplifier with an input connected to said C.E.M.F. sensing means and said source of variable voltage to amplify the difference between the two and having an output connected to said last mentioned delay means through said comparing means.

* * * * *